United States Patent [19]
Nishimura et al.

[11] Patent Number: 5,101,102
[45] Date of Patent: Mar. 31, 1992

[54] ROTARY ENCODER HAVING A PLURALITY OF BEAMS EMITTED BY A DIFFRACTION GRATING

[75] Inventors: Tetsuharu Nishimura; Koh Ishizuka, both of Kawasaki, Japan

[73] Assignee: Canon Kabushiki Kaisha, Tokyo, Japan

[21] Appl. No.: 527,704

[22] Filed: May 23, 1990

Related U.S. Application Data

[63] Continuation of Ser. No. 259,432, Oct. 18, 1988, abandoned, which is a continuation of Ser. No. 18,536, Feb. 25, 1987, abandoned.

[30] Foreign Application Priority Data

Feb. 28, 1986 [JP] Japan ................................ 61-44556
Feb. 28, 1986 [JP] Japan ................................ 61-44557
Mar. 5, 1986 [JP] Japan ................................ 61-48019

[51] Int. Cl.$^5$ ............................................. G01D 5/34
[52] U.S. Cl. ........................... 250/231.16; 250/237 G; 356/356
[58] Field of Search ........ 250/231 SE, 237 G, 231.13, 250/231.14, 231.16; 341/13, 14; 356/351, 354, 356, 358

[56] References Cited

U.S. PATENT DOCUMENTS

| 3,726,595 | 4/1973 | Matsumoto | 356/356 |
|---|---|---|---|
| 3,738,753 | 6/1973 | Huntley, Jr. | 356/358 |
| 3,756,723 | 9/1973 | Hock | 356/354 |
| 3,842,261 | 10/1974 | MacGovern et al. | 250/237 G |
| 3,891,321 | 6/1975 | Hock | 356/356 |
| 3,983,391 | 9/1976 | Clemons | 250/237 G |
| 4,629,886 | 12/1986 | Akiyama et al. | 250/237 G |
| 4,676,645 | 6/1987 | Taniguchi et al. | 250/237 G |

FOREIGN PATENT DOCUMENTS

| 3316144 | 11/1983 | Fed. Rep. of Germany . |
|---|---|---|
| 3512002 | 12/1985 | Fed. Rep. of Germany . |
| 3633574 | 4/1988 | Fed. Rep. of Germany . |
| 61039289 | 6/1983 | Japan . |
| 58-191906 | 9/1983 | Japan . |
| 58-191907 | 9/1983 | Japan . |
| 991710 | 5/1965 | United Kingdom . |
| 1209342 | 10/1970 | United Kingdom . |
| 1287462 | 8/1972 | United Kingdom . |
| 1474049 | 5/1977 | United Kingdom . |

*Primary Examiner*—David C. Nelms
*Attorney, Agent, or Firm*—Fitzpatrick, Cella, Harper & Scinto

[57] ABSTRACT

A rotary encoder wherein coherent beams are caused to be incident at different positions of a diffraction grating mounted on a rotary object, different beams diffracted from the diffraction grating are caused to overlap and form interference fringes, the fringes are detected by a light receiving detector to detect a rotational state of the rotary object, and the parallelism a of the rotary object satisfies the following inequality:

$$a \leq \tan^{-1}[\{\pi(m-n)\lambda/360n_0P\}\theta k].$$

14 Claims, 4 Drawing Sheets

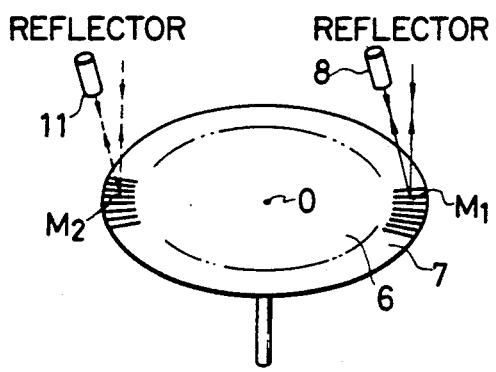
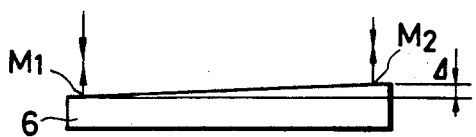
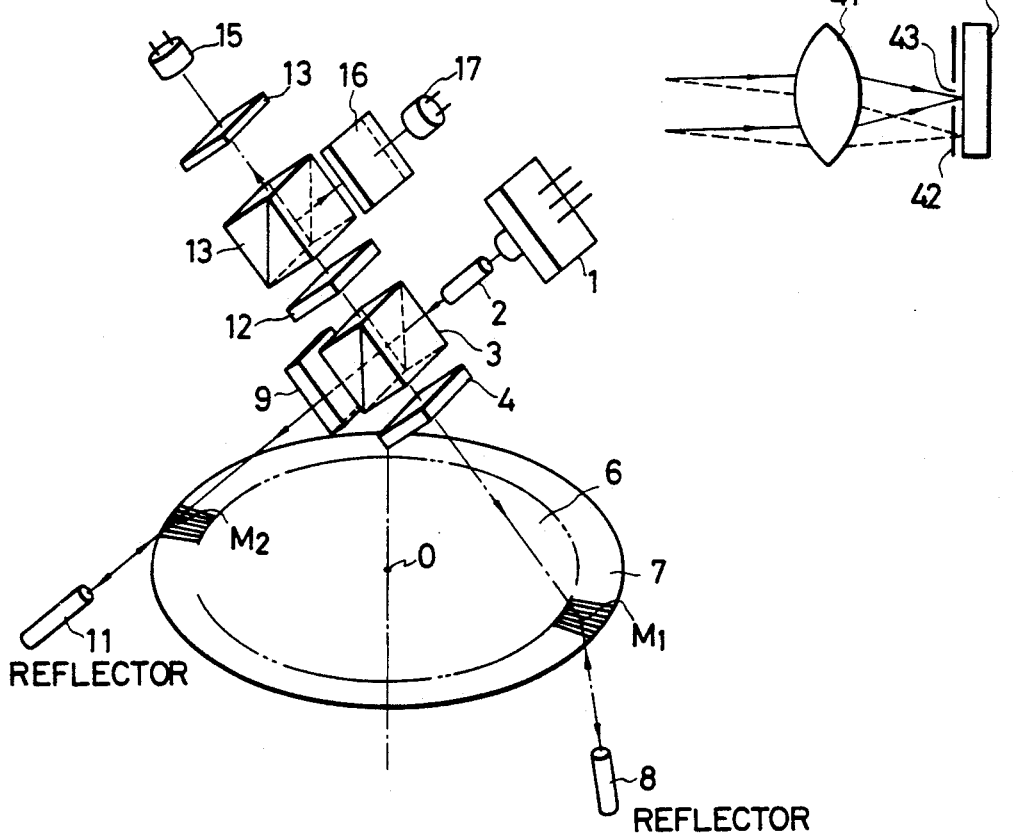

$\varphi_p$ : ANGLE PITCH $\varphi_w$ : ANGLE OF TRANSMISSIONAL AREA (OR REFLECTIVE AREA)

$$\eta = \frac{\sin^2(\pi m \varphi_w/\varphi_p)}{\pi^2 m^2}$$

ROTARY ENCODER HAVING A PLURALITY OF BEAMS EMITTED BY A DIFFRACTION GRATING

This application is a continuation of application Ser. No. 259,432, filed Oct. 18, 1988, abandoned, which is a continuation of application Ser. No. 018,536, filed Feb. 25, 1987, now abandoned.

BACKGROUND OF THE INVENTION

1. Field of the Invention

The present invention relates to a rotary encoder and, more particularly, to a rotary encoder wherein a radial diffraction grating is mounted on a rotary object, a beam from, e.g., a laser is radiated onto the diffraction grating, and a rotational state represented by a rotational speed, a rate of change in rotational speed, and a rotational angle of the diffraction grating or the rotary object is photoelectrically detected utilizing light diffracted by the diffraction grating.

2. Related Background Art

Conventional photoelectric rotary encoders have been used as means for detecting rotational speeds, rotational angles, and rates of changes in rotational speeds of rotary objects or mechanisms such as computer equipment (e.g., floppy disk drives), office equipment (e.g., printers), NC machine tools, and VTR capstan motors and rotary drums.

A typical example of the conventional photoelectric rotary encoder employs a so-called index scale system, as shown in FIG. 1. In this rotary encoder, a so-called main scale 31 and a so-called stationary index scale 32 are interposed between light-emitting means 33 and light-receiving means 34. The main scale 31 has light-transmitting and light-shielding areas formed at the peripheral portion of a disk 35 at equal angular intervals. The disk 35 is connected to a rotating shaft 30. The index scale 32 has light-transmitting and light-receiving areas at the same equal angular intervals as those of the main scale 31. According to this system, upon rotation of the main scale 31, signals synchronized with the intervals between the light-transmitting and light-receiving areas of the scales 31 and 32 are obtained from the light-receiving means 34. The frequency of the resultant signals is analyzed to detect a rate of change in rotational speed of the rotating shaft. For this reason, when the intervals between the light-transmitting and light-receiving areas of the scales 31 and 32 are reduced, detection precision can be improved. When the intervals between the light-transmitting and light-receiving areas of the scales 31 and 32 are reduced, however, diffraction occurs in the scales 31 and 32. An S/N ratio of an output signal from the light-receiving means is degraded by the influence of diffracted light, and detection precision is undesirably degraded. If the numbers of the light-transmitting and light-receiving areas of the main scale 31 are determined and the intervals between the light-transmitting and light-receiving areas are increased so as not to receive the influence of the diffracted light, the diameter of the disk of the main scale 31 must be increased and the encoder itself becomes thick and bulky in order to obtain stability of the scale. As a result, the rotary object is undesirably overloaded.

U.S. Pat. Nos. 3,726,595 and 3,738,758 describe conventional linear encoders. According to these encoders, a coherent beam is radiated onto the diffraction grating mounted on a moving object, beams of predetermined orders output from the diffraction grating are caused to overlap and form interference fringes, the fringes are detected by a light-receiving means, and intensity of the fringes on the light-receiving surface is photoelectrically converted upon movement of the moving object, thereby obtaining an electrical signal (pulses) and hence detecting a displacement of the moving object.

When the interference fringe detection scheme in this linear encoder is applied to a rotary encoder, all the disadvantages of the conventional rotary encoder are assumed to be solved. However, when the above scheme is actually applied to the rotary encoder, a radial grating as a diffraction grating is formed on a rotary object such as a disk to constitute a scale, and a coherent beam is radiated onto the radial grating of the scale. Since the center of the radial grating is not accurately aligned with the center of the rotary object, an eccentricity often causes a measurement error.

Light components diffracted and output from a plurality of positions of the radial grating are allowed to effectively interfere with each other in order to reduce the influence of the eccentricity. However, if the thickness in the direction parallel to an axis of rotation (parallelism) of the scale comprising a rotary object such as a disk varies, a difference between the optical paths of the diffracted components to be interfered occurs. As a result, a measurement error may occur again.

SUMMARY OF THE INVENTION

It is an object of the present invention to provide a rotary encoder having parallelism for satisfying a predetermined tolerance during measurement under an assumption of a requirement for parallelism of a rotary object in a rotary encoder in consideration of the above problems.

In order to achieve the above object of the present invention, there is provided a rotary encoder wherein coherent beams are radiated at different positions of a diffraction grating mounted on a rotary object, different beams diffracted from the diffraction grating are caused to overlap and form interference fringes, and the fringes are detected by a light-receiving means to detect a rotational state of the object, characterized in that parallelism a of the object satisfies the following inequality:

$$a \leq \tan^{-1}[\{\pi(m-n)\lambda/360 n_0 P\} \theta K]$$

where m and n are orders of diffracted beams, $n_0$ is the refractive index of the object, P is the pitch of the diffraction grating, $\lambda$ is the wavelength of the coherent beam, and $\theta K$ is the allowable value of the angular error.

In the present invention, there is provided a compact rotary encoder wherein a separation angle $\Delta$ of the diffracted beams of adjacent orders among a plurality of beams diffracted and output from the diffraction grating satisfies the inequality $\Delta > 3°$.

If the pitch P is less than 15 $\mu$m, the rotary encoder is made more compact.

In order to increase the intensity of interference fringes detected by the light-receiving means and to improve sensitivity thereof, the diffraction grating is preferably designed such that the intensity of the diffracted beams of a predetermined order subjected to overlapping is maximum in all beams diffracted and output from the diffraction grating.

Further features of the present invention will be apparent from the following embodiments.

BRIEF DESCRIPTION OF THE DRAWINGS

FIG. 4 is a schematic partial perspective view showing a modification of the rotary encoder shown in FIG. 2;

FIG. 5 is a sectional view of a disk 6 serving as a scale of the rotary encoder shown in FIG. 4;

FIG. 6 is a schematic perspective view of a rotary encoder according to another embodiment of the present invention;

FIG. 7 is a schematic view showing an arrangement of a reflecting means in the rotary encoder shown in FIGS. 2 to 6;

DETAILED DESCRIPTION OF THE PREFERRED EMBODIMENTS

Figure 2:
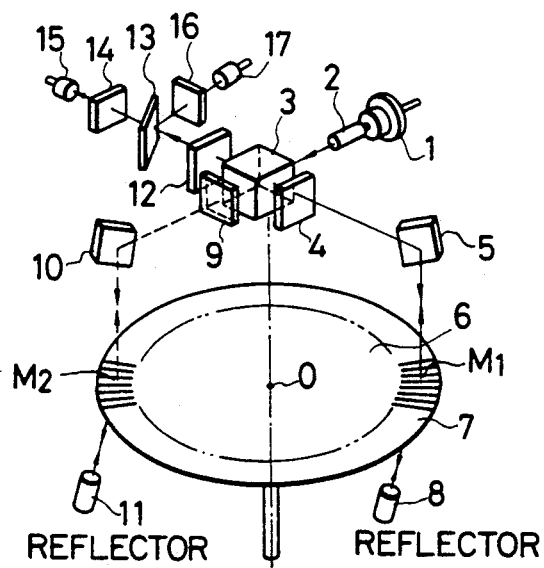
FIG. 2 is a schematic perspective view showing a rotary encoder according to an embodiment of the present invention.

FIG. 2 is a schematic perspective view showing a rotary encoder according to an embodiment of the present invention.

A beam emitted from a laser 1 is collimated by a collimator lens 2. The collimated beam is incident on a polarizing beam splitter 3. The beam splitter 3 splits the incident light into two linearly polarized, reflected and transmitted beams having the same intensity. The reflected beam passes through a λ/4 plate 4 and a reflecting mirror 5 and is thus converted into a circularly polarized beam. The resultant beam is incident at a position M1 of a radial grating 7 mounted on a disk 6 which serves as an optical scale and which is connected to a rotary object subjected to measurement. A beam of a specific order, e.g., the +mth order among the plurality of beams incident on and diffracted by the radial grating 7 is reflected by a reflecting means 8. The reflected beam returns along an optical path identical with the incident optical path. The reflected beam is thus incident on the position M1 of the radial grating 7 again. A beam of a predetermined order diffracted by the radial grating 7 again passes the reflecting mirror 5 and the λ/4 plate 4 and is thus converted into a linearly polarized beam having a polarization direction shifted through 90° from that of the first incident beam. The linearly polarized beam is then incident on the polarizing beam splitter 3.

In this embodiment, the incident and return paths of the diffracted light of the predetermined order between the polarizing beam splitter 3 and the reflecting means 8 are the same.

The reflecting means 8 may comprise an optical element such as a normal reflecting mirror, but preferably an optical element such as a corner cube which collimates the beam incident on the optical element.

For example, as shown in FIG. 7, a reflecting mirror 40 as the optical element described above is located on substantially the focal plane of a focusing lens 41, and only the diffracted beam of the predetermined order incident as a collimated beam onto the focusing lens 41 passes through an opening 43 of a mask 42. The beam passing through the opening 43 is reflected by the reflecting mirror 40 and returns to the same optical path. In this case, the beams of other orders are shielded by the mask 42. The reflecting means 8 may be any optical system such as a cat's eye optical system if the optical system has the same function as the reflecting mirror 40. When such an optical system is used, the reflected beam can be returned along the same optical path as the incident optical path even if an oscillating wavelength of the laser 1 is changed and the diffraction angle is slightly changed.

A gradient index lens such as a SELFOC microlens (tradename) available from Nippon Sheet Glass Co., Ltd. can be used in the cat's eye optical system, and a reflecting film can be formed on one end face since both end faces are parallel to each other, thereby using it effectively as a desired optical element which has a simple structure and can be manufactured in a mass production line.

Referring back to FIG. 2, the transmitted beam of the components split by the polarizing beam splitter 3 is converted by the λ/4 plate 9 into a circularly polarized beam. This beam passes through a reflecting mirror 10 and is incident on a position M2 symmetrical about rotational axis 0 with the position M1 on the radial grating 7 on the disk 6 as the optical scale. A beam of the specific order, e.g., the −mth order among the beams incident, diffracted, and transmitted through the radial grating 7 is reflected by a reflecting means 11 having the same arrangement as the reflecting means 8. The reflected beam is returned along the same optical path as the incident optical path and is incident on the position M2 of the radial grating 7 again. A beam of a specific order diffracted again by the radial grating is converted by the reflecting mirror 10 and the λ/4 plate 9 into a linearly polarized beam having a polarization direction rotated through 90° from that of the first incident beam. The resultant linearly polarized beam is incident on and reflected by the polarizing beam splitter 3.

In this case, the incident and return optical paths of the diffracted beam of the specific order between the polarizing beam splitter 3 and the reflecting means 11 are the same as in the beam diffracted at the position M1. The beam overlaps the diffracted light incident on the polarizing beam splitter 3 through the reflecting means, and the resultant beam is converted by a λ/4 plate 12 into a circularly polarized beam. This beam is split into two beams by a beam splitter 13. The respective beams are converted by polarizing plates 14 and 16 into linearly polarized beams which are 90° out of phase. The polarizing plates 14 and 16 are located to be inclined such that an angle formed by the polarization directions is 45°. The linearly polarized beams are incident on light-receiving means 15 and 17, respectively. The intensities of interference fringes formed on the light-receiving surfaces of the light-receiving means 15 and 17 are detected.

In the above embodiment, when the rotary object subjected to measurement is rotated by one pitch of the radial grating 7, the phase of the beam of the mth order is changed by $2m\pi$. The phase of the beams of the nth order diffracted again by the radial grating is changed by $2n$. Therefore, each of the light-receiving means 15 and 17 generates $(2m-2n)$ sinusoidal waves. In this embodiment, a rotational angle is measured by detecting these sinusoidal waves.

Figure 3:
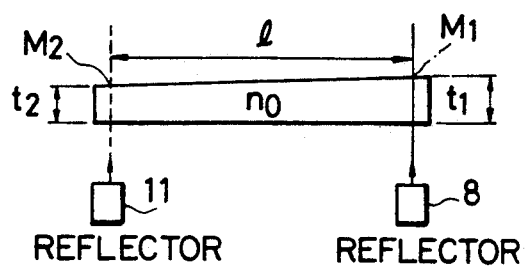
FIG. 3 is a sectional view of a disk 6 serving as a scale shown in FIG. 2 so as to explain a characteristic feature of the present invention.

FIG. 3 is a sectional view of the disk 6 of the rotary encoder shown in FIG. 2. The optical system above the disk 6 is omitted. The same reference numerals as in FIG. 2 denote the same parts or positions in FIG. 3. Reference symbol l denotes a distance between the positions M1 and M2 on the radial grating; and t1 and t2, thicknesses of the disk at the positions M1 and M2.

In the rotary encoder utilizing the transmitted diffracted beam, as shown in FIG. 2, assume that the disk 6 serving as the scale constituting the radial grating 7, as shown in the sectional view of FIG. 3, has a wedge-like shape. In this case, the optical path length of the +mth order diffracted beam incident on the position M1 and diffracted again, as indicated by the solid line, differs from the optical path length of the −mth order diffracted beam incident on the position M2 and diffracted again, as indicated by the broken line. As a result, a measurement error occurs.

The beams incident on and output from the positions M1 and M2 reciprocate the corresponding paths with respect to the radial grating 7. If a difference between the thicknesses at the positions M1 and M2 is given $\Delta = t1 - t2$, the difference between the optical path length of the light passing through the position $M_1$ and the light passing through the position $M_2$ is given by $n_0 \times \Delta = \lambda/2$ where $n_0$ is the refractive index of the disk 6 having the radial grating 7 thereon and $\lambda$ is the oscillating wavelength of the laser 1. Every time the disk 6 revolves once, an error of $\pm 1$ pulse (a sinusoidal wave) occurs. Therefore, $\Delta k$ for defining an error of $\pm k$ pulses per revolution is given by the following equation:

$$\Delta k = k\lambda/2n_0 \quad (1)$$

Parallelism a of the disk 6 having the radial grating 7 thereon is:

$$a = \tan^{-1}(\Delta K/l) = \tan^{31\,1}(k\lambda/2n_0 l) \quad (2)$$

Figure 1:
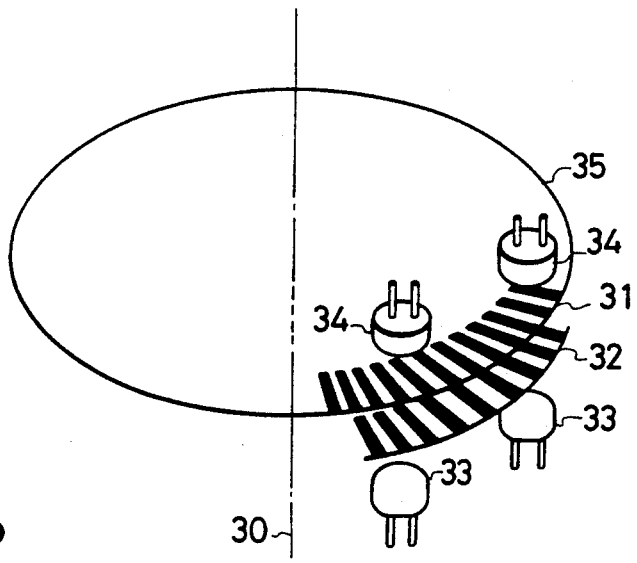
FIG. 1 is a schematic perspective view showing a conventional rotary encoder.

An angular resolution $\theta$ per pulse of the rotary encoder shown in FIG. 1 is given as follows when diffracted beams of the $\pm$mth orders are used:

$$\theta = 360° \times 60^2/4mN(\text{sec}) = 324{,}000/mN(\text{sec}) \quad (3)$$

where N is the total number of the light-transmitting and light-shielding areas of the radial grating 7 on the disk 6.

The incident positions M1 and M2 are symmetrical about the central axis O of the radial grating. The grating pitch P at each incident point is given as $P = \pi l/N$, so that the angular resolution $\theta$ in equation (3) is given as follows:

$$\theta = 324{,}000 P/\pi ml \quad (4)$$

The error per $\pm k$ pulses is represented by an error of $\theta$ k seconds as follows:

$$\theta k = 324{,}000 kP/\pi ml \quad (5)$$

Equations (2) and (5) yield, the relationship between the angular error $\theta$ K (sec) and parallelism a of the disk 6 having the radial grating 7 thereon in the rotary encoder shown in FIG. 1, as follows:

$$\tan a = (\pi m\lambda/648{,}000 n_0 P)\cdot\theta k \quad (6)$$

In order to obtain measurement precision of $\theta$ k seconds, parallelism a of the disk 6 must satisfy the following inequality:

$$a \leq \tan^{-1}\{(\pi m\lambda/648{,}000 n_0 P)\theta k\} \quad (7)$$

In the rotary encoder shown in FIG. 1, the disk 6 having desired angular precision is prepared satisfying condition (7). The disk 6 is prepared on the basis of condition (7). When a practical rotary encoder is designed, its final specifications must be decided in consideration of other measuring errors caused by other reasons excluding parallelism of the disk 6.

A case which satisfies inequality (7) will be described below. In the rotary encoder shown in FIG. 2, if orders of diffracted beams are given as $m = \pm 1$, the oscillating frequency of the laser 1 is given as $\lambda = 0.78$ $\mu$m, the pitch of the radial grating 7 is given as $P = 2.85$ $\mu$m, and the refractive index of the disk 6 is given as $n_0 = 1.5$, parallelism a of the disk 6 for the required angular precision $\theta$ k is:

$$a \leq \tan^{-1}(8.84 \times 10^{-7}\cdot\theta k)$$

In order to guarantee the measurement precision of $\theta$ k = 10 (sec), the required parallelism of the disk 6 is given by substituting $\theta$ k = 10 into the above inequality:

$$a \leq 5.07 \times 10^{-4}(\deg) \approx 1.8(\sec)$$

FIGS. 4 and 5 are views showing the mode of operation utilizing reflected diffracted beams in the rotary encoder in FIG. 2. The same reference numerals as in FIGS. 2 and 3 denote the same parts in FIGS. 4 and 5. In a so-called reflecting rotary encoder, the tolerance of parallelism a of the disk 6 for measurement precision of $\theta$ k can be calculated using inequality (7).

In the rotary encoder shown in FIG. 2, diffracted beams are incident again on the positions M1 and M2 by using the reflecting means 8 and 11, and diffracted beams are then generated again. However, without using the reflecting means 8 and 11, the diffracted beams generated at the positions M1 and M2 directly overlap by a predetermined means to produce interference fringes. In this case, when the rotary object subjected to measurement is rotated by one pitch of the radial grating 7, the phase of the diffracted beams of the mth order is changed by $m\pi$. Similarly, the beam of the nth order diffracted at a position different from the above position on the radial grating 7 is changed by $n\pi$. As a result, $(m-n)$ sinusoidal waves are output from the light-receiving means.

In the description with reference to FIG. 2, the beams of the $\pm$mth orders are caused to interfere with each other to derive inequality (7). However, the diffracted beams to be interfered with each other need not be limited to those having the same orders. Therefore, inequality (7) is not a general one for the present invention, and a general condition will be derived below.

If the number of times of diffraction, i.e., the number of cycles of the beams incident on the radial grating of the diffracted beams of specific orders used for forming interference fringes is given as x, an optical length difference is given as $n_0 \times \Delta = \lambda/x$. Every time the disk 6 is rotated by one revolution, an error of $\pm 1$ pulse occurs. Therefore, equation (1) can be rewritten as follows:

$$\Delta k = k\lambda/xn_0 \qquad (1)'$$

Equation (2) representing the parallelism of the disk 6 is:

$$a = \tan^{-1}(k\lambda/xn_0 l) \qquad (2)'$$

The parallelism a in the present invention corresponds to a ratio of scale thicknesses at the output positions with respect to a distance between the output positions of the two diffracted beams to be interfered.

When the angular resolution $\theta$ per pulse in the rotary encoder according to the present invention is represented in degrees, $$\theta = 360/x(m-n)N \qquad (3)'$$

Equation (3)' is rewritten using the grating pitch P and the distance between the positions M1 and M2 as, $$\theta = 360P/\pi lx(m-n) \qquad (4)'$$

An error per $\pm k$ pulses is an error of $\theta k$ degrees as follows:

$$\theta k = 360kP/\pi lx(m-n) \qquad (5)'$$

Equations (2)' and (5)' yield the relationship between the angular error $\theta k$ (degrees) and the parallelism a (degrees) of the disk 6 having the radial grating 7 in the rotary encoder according to the present invention:

$$\tan a = \{\pi(m-n)\lambda/360n_0 P\}\theta k \qquad (6)'$$

In order to obtain a rotary encoder having a tolerance falling within the angular error of $\theta k$ (degrees), the parallelism a (degrees) of the disk 6 must be:

$$a \leq \tan^{-1}[\{\pi(m-n)\lambda/360n_0 P\}\theta k] \qquad (7)'$$

A coherent beam is incident on a scale having a diffraction grating satisfying inequality (7)' in the rotary encoder according to the present invention, and a rotational state of the rotary object is measured within a predetermined range of angular errors. In other words, the value of the allowable angle error is set according to the specification of the rotary encoder by using inequality (7)'. The rotary object is designed and manufactured to obtain parallelism of the rotary scale constituting a rotary encoder so as to satisfy the allowable angular error. The lower limit value of inequality (7)' is zero, and it is preferable to form a diffraction grating on a rotary object having perfect parallelism.

The rotary encoder shown in FIG. 2 utilizes the diffracted beams obtained from the positions M1 and M2 symmetrical about the center of the radial grating. Even if the diffracted beams are obtained from two asymmetrical positions spaced apart by 120°, inequality (7)' can be utilized.

In the rotary encoder in FIG. 2, if the diffraction grating pitch is 2.85 $\mu$m and the diffracted beams are those of $\pm 1$ orders, four sinusoidal waves are obtained from a light-receiving element when the rotary object is rotated by 2.85 $\mu$m, the rotary scale pitch. In other words, the resolution per sinusoidal wave corresponds to $\frac{1}{4}$ of the pitch of the diffraction grating, i.e., $2.85/4 = 0.71$ $\mu$m.

In this embodiment, the beam is split into the beam splitter 13 into two beams 90° out of phase, thereby also discriminating the rotational direction of the rotary object.

In order to measure only rotational angles, the beam splitter 13, the polarizing plates 14 and 16, and one of the light-receiving means can be omitted.

As described above, by utilizing the diffracted beams from the two positions symmetrical about the center of rotation, a difference between the center of rotation of the rotary object and the center of the radial grating is reduced to minimize the measurement error.

The components of one beam near the center of the rotational axis are allowed to overlap the components of the other beam, incident symmetrically about one beam, near the center of the rotational axis. Similarly, the corresponding components of the beams away from the center of rotation are allowed to overlap each other. Therefore, the influence of wavefront aberration caused by a difference between inner and outer pitches of the radial grating can be eliminated.

The reciprocal optical path of the diffracted beams of the specific orders between the polarizing beam splitter 3 and the reflecting means 8 and 11 is unchanged. Therefore, overlapping of the two diffracted beams in the polarizing beam splitter 3 can be simplified, and assembly precision of the rotary encoder can be improved.

The $\lambda/4$ plates 4 and 9 may be located at any positions between the polarizing beam splitter 3 and the reflecting means 8 and 11.

In each embodiment described above, reflected diffracted light may be used in place of the transmitted diffracted light.

A diffraction grating used in the present invention includes a so-called amplitude diffraction grating consisting of light-transmitting and light-shielding areas, and a phase diffraction grating consisting of areas having different refractive indices. In particular, the phase diffraction grating can be prepared by forming a three-dimension relief pattern at a peripheral portion of a transparent disk. The phase diffraction gratings can be manufactured by an embossing or stamper process in a mass production line.

In the rotary encoder according to the embodiment of the present invention, a diffraction grating is mounted on a rotary scale having parallelism satisfying the desired tolerance during measurement. Therefore, the rotary encoder can always satisfy the required measurement precision.

The interference fringe detection system utilizes diffracted beams in a linear encoder as well as in the rotary encoder described in the above embodiment. When unnecessary diffracted beams, and especially, the beams of adjacent orders are incident on a predetermined optical member for guiding the diffracted beams to the light-receiving means at the time when the beams or predetermined orders used for forming the interference fringes are to be directed toward the optical member, the unnecessary diffracted beams becomes noise during measurement, and measurement precision is degraded.

In the following embodiment, a method for easily solving the above problem will be described below.

FIG. 6 is a schematic view showing a rotary encoder according to another embodiment of the present invention.

The same reference numerals as in FIG. 2 denote the same parts in FIG. 6, and a detailed description thereof will be omitted.

The rotary encoder in FIG. 6 differs from that of FIG. 2 in that the reflecting mirrors 5 and 10 in FIG. 2 are not used and beams are directly incident on a disk 6 through a polarizing beam splitter 3 and λ/4 plates 4 and 9 in the rotary encoder of FIG. 6.

An optical path connecting the laser 1 and each member in the arrangement of FIG. 2 is substantially parallel to the surface of the disk 6. However, in the arrangement of FIG. 6, this optical path is inclined with respect to the surface of the disk 6. The arrangement of FIG. 2 is preferred to obtain a low-profile encoder.

Other arrangements of the rotary encoder shown in FIG. 6 are substantially the same as those of the rotary encoder in FIG. 2. The measurement scheme of the disk 6 of the encoder in FIG. 6 is the same as that in FIG. 2, and a detailed description thereof will be omitted.

Parallelism a of the disk 6 in this embodiment satisfies condition (7)', and a rotational state of the disk 6 can be detected with desired precision.

A structural problem posed by the rotary encoder shown in FIG. 6 is the disposition of, especially, the reflecting means 8 and 11. The reflected and transmitted beams split by the polarizing beam splitter 3 are respectively incident on positions M1 and M2 of the radial grating 7. In this case, a plurality of transmitted diffracted beams of 0th, ±1st, and ±2nd orders are output from the positions M1 and M2. When the beams of ±1st orders from the positions M1 and M2 are used to form interference fringes, it is undesirable to cause the diffracted beams of 0th and ±2nd orders to be incident on the reflecting means 8 and 11. Therefore, the rotary encoder shown in FIG. 6 is designed to satisfy condition (10) below.

Unlike in Fresnel diffraction posing a problem in a conventional photoelectric rotary encoder using main and index scales, in the encoder of an interference fringe detection system according to the present invention, the pitches of the diffraction grating are minimized to establish an approximation of fraunhofer diffraction. Assume that the angle of the beam incident on the diffraction grating is given as $\theta$ i and that the diffraction angle of the diffracted beam of nth order by fraunhofer diffraction is given as $\theta$ n. The relationship between these components and wavelength λ of the beam to be diffracted is given as follows:

$$P(\sin\theta n - \sin\theta i) = n\lambda \tag{8}$$

The separation angle between the beams of the adjacent orders is given as Δ:

$$\Delta = \sin^{-1}\{(n+1)\lambda/P + \sin\theta i\} - \sin^{-1}\{n\lambda/P + \sin\theta i\} \tag{9}$$

for (n = 0, 1, 2, 3, ...)

In the encoder of the interference fringe detecting system in consideration of usable coherent beams, the arrangement of the optical system, and beam spot diameters, the separation angle Δ represented by equation (9) preferably satisfies the following condition:

$$|\Delta| > 3° \tag{10}$$

When the separation angle Δ is less than 3°, the difference between the adjacent diffraction angles is excessively small. In order to separate a diffracted beam of a desired order from beams of other orders so as to utilize only the beam of the desired order, the optical elements such as the reflecting means 8 and 11 in FIG. 6 must be located far away from the positions M1 and M2. In this case, the optical length is inevitably prolonged to fail to provide a compact encoder, and system stability is degraded.

The pitch P of the diffraction grating in this embodiment is 2.85 μm, and the separation angle is more than 15° even if the currently available laser device is used as the laser 1, thus sufficiently satisfying condition (10). The unnecessary diffracted beams are not incident on the reflecting means 8 and 11, and the reflecting means 8 and 11 can be located near the positions M1 and M2. Therefore, a highly precise, compact rotary encoder can be provided.

Since the beams can be vertically incident on the diffraction grating, i.e., since $\theta$ i = 0, equations (8) and (9) yield the following:

$$\Delta = \sin^{-1}\{(n+1)\lambda/P\} - \sin^{-1}\{n\lambda/P\} > 3° \text{ for } (n=0, 1, 2, ...) \tag{11}$$

In this case, the upper limit values of the pitch P (μm) of the diffraction grating which satisfy equation (4) at the corresponding wavelengths λ of the typical coherent beams are summarized below.

| λ | 0.7 | 0.8 | 1.0 | 1.3 | 1.6 |
|---|-----|-----|-----|-----|-----|
| P | 13  | 15  | 19  | 24  | 30  |

If an expensive semiconductor laser is used as a laser, the wavelength λ of the light source of this type falls within the range of 0.78 to 0.80 μm. The pitch P of the diffraction grating is preferably less than 15 μm.

In the case of the interference fringe detection system of this type, the pitch of the diffraction grating formed on a predetermined moving object directly depends on measurement precision. The smaller the pitch of the diffraction grating becomes, the higher the measurement precision of the encoder becomes. Therefore, the pitch of the diffraction grating must be determined according to the specifications of the encoder, e.g., the required detection precision, the encoder configuration, and its size.

The encoder according to this embodiment eliminates an adverse affect caused by a plurality of diffracted beams, and especially, diffracted beams of adjacent orders from the diffraction grating of the scale having predetermined parallelism. At the same time, the encoder can be made compact and can have a lower profile and can perform measurement with high precision.

Figure 8:
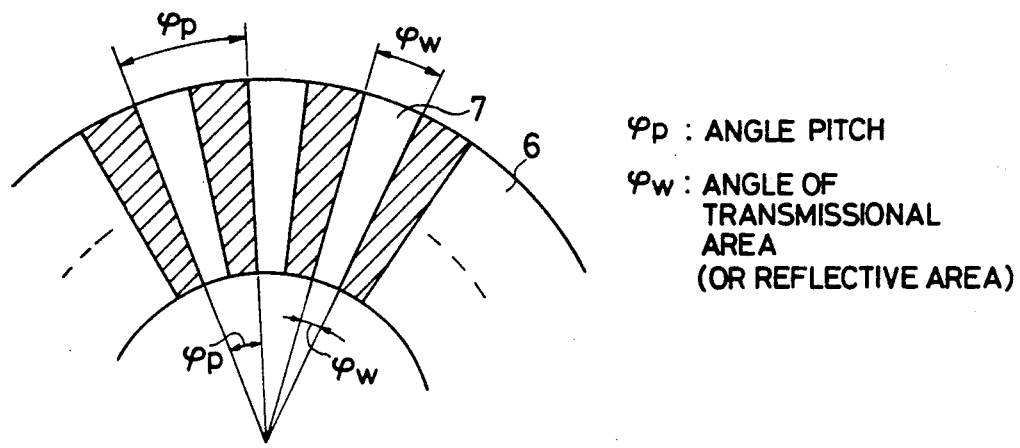
FIG. 8 is a view for explaining a radial grating of a scale used in the present invention.

FIG. 8 shows a radial grating of a scale used in the encoder of each embodiment. In the same manner as in FIGS. 2 and 6, the encoder includes a disk 6 and a radial grating 7. The radial grating 7 consists of light-absorbing areas indicated by hatched areas and light-transmitting areas indicated by blank areas. The radial grating 7 has an angular pitch $\phi P$, and each light-transmitting area has a central angle $\phi W$.

A ratio $\phi W/\phi P$ of the angle $\phi W$ of the light-transmitting area (or a light-reflecting area) to the angular pitch $\phi P$ of the radial grating 7 is set to be 0.5 in each embodiment described above. In the amplitude diffraction grating shown in FIG. 8, a duty ratio of the black-and-white chart is set to be 50%, and the diffracted beams of ±1st order have the highest intensity. As a result, efficiency of interference of the interference fringes formed by the polarizing beam splitter 3 and detected by the light-receiving means 15 and 17 can be improved. The radial grating shown in FIG. 8 can be used to prevent generation of the diffracted beams of ±2nd orders, thereby preventing generation of ghost light or the like, and a detailed description thereof will be described later.

Efficiency of diffraction of the diffracted beam of the mth order in the amplitude diffraction grating shown in FIG. 8 is represented by equation (17) below:

$$\eta m = \sin^2(\pi m W/P)\pi^2 m^2 \quad (12)$$

where $\phi P$ is the angular pitch, and $\phi W$ is the light-transmitting area angle.

Figure 9:
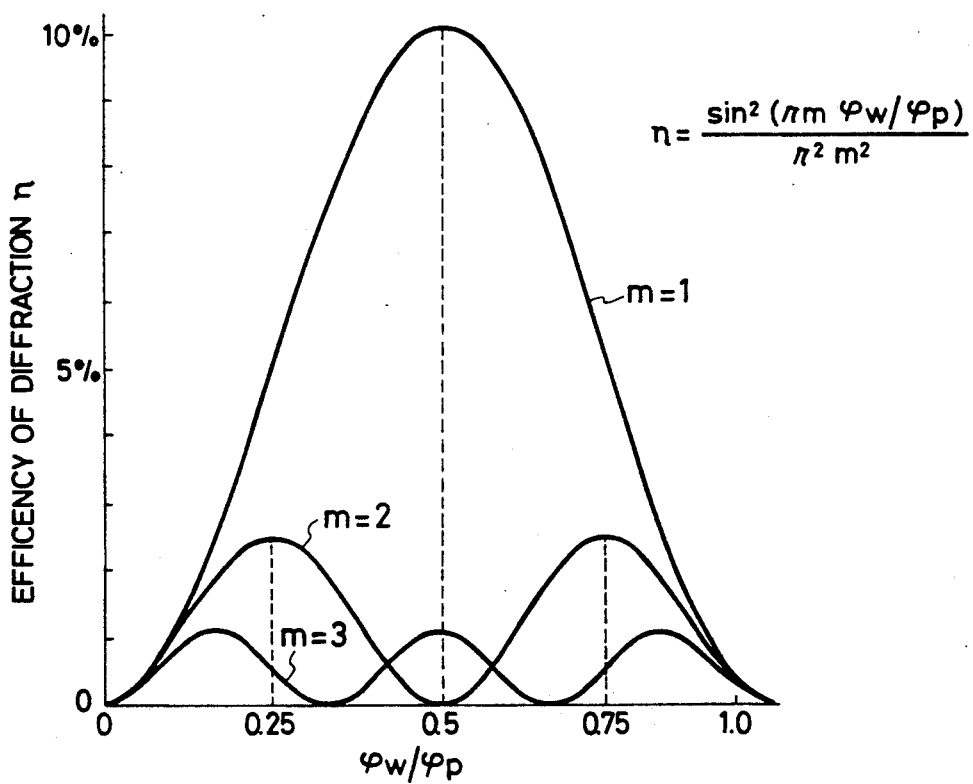
FIG. 9 is a graph showing efficiency $\eta$ of diffraction as a function of the duty $\phi W/\phi P$ of an amplitude type diffraction grating.

The relationship between the ratio $\phi W/\phi P$ and the efficiency $\eta m$ of diffraction by using equation (12) is illustrated in FIG. 9. The duty ratio $\phi W/\phi P$ is plotted along the abscissa of FIG. 9, and efficiency $\mu$ m of diffraction is plotted along the ordinate.

Figure 10:
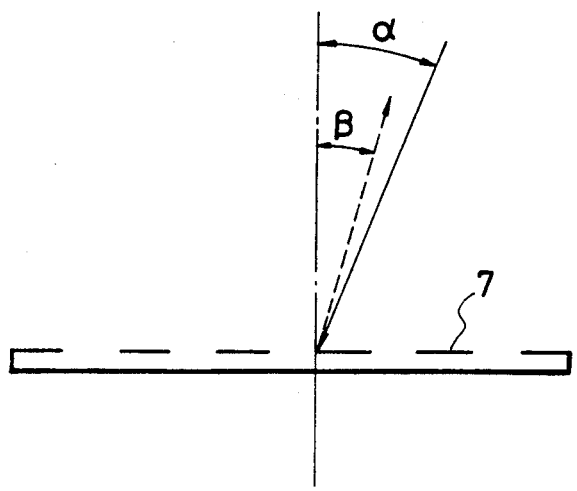
FIG. 10 is a view for explaining reflected ghost light generated in the diffraction grating.

As is apparent from FIG. 9, when the diffracted beam of first order is used, efficiency $\eta 1$ of diffraction at $\phi W/\phi P = 0.5$ is 10%, which indicates that the intensity of the diffracted beam is the highest. Efficiency $\eta 2$ of diffraction of the diffracted beam of second order is 0, so that the diffraction grating having $\phi W/\phi P = 0.5$ does not generate diffracted beams of ±2nd orders. For example, in the encoder shown in FIG. 6, the diffracted beam of a specific order is substantially vertically incident on the radial grating 7, so that a coherent beam is often incident on the radial grating 7 at a diffraction angle $\alpha$ of the diffracted beam of the specific order. In this case, a reflected ghost beam reflected and diffracted at an angle $\beta$ is generated, as shown in FIG. 10. The reflection and diffraction condition is defined as follows:

$$P(\sin\alpha + \sin\beta) = m\lambda \quad (13)$$

The transmission and diffraction condition when the beam is incident at the diffraction angle of the first order is given as follows:

$$P \sin \alpha = \lambda \quad (14)$$

The reflection and diffraction condition can be rewritten as follows:

$$P \sin \beta = (m-1)\lambda \quad (15)$$

If $m=2$, then $\alpha = \beta$. In this case, the diffracted beam of the second order is output and returned along the incident optical path. This diffracted beam interferes detection of interference fringes since it serves as so-called ghost light. However, as described above, since the duty ratio is set to be 50%, i.e., $\phi W/\phi P = 0.5$, generation of the diffracted beam of the second order can be prevented. Therefore, detection precision of the interference fringes is not degraded by such ghost light.

When the diffracted beams of second and third orders are used to increase the measurement resolution, the diffraction grating (e.g., the radial grating) is designed such that the ratio $\phi W/\phi P$ for the diffracted beam of 2nd order is 0.25, and that the ratio for the diffracted beam of 3rd order is 0.5. In the amplitude diffraction grating of this type, no duty ratio is present so as to set efficiency $\eta$ m of diffraction of mth order to be equal to efficiency $\eta$ m of diffraction of nth order. It is thus preferable to use positive and negative diffracted beams of identical orders (m=n) used in the encoder. In this case, visibility of the interference fringes is the highest, and detection precision is good.

The above description has been associated with the amplitude diffraction grating. However, a phase diffraction grating can be used in the encoder according to the present invention. In particular, the phase diffraction grating has a larger efficiency of diffraction than that of the amplitude diffraction grating. It is very effective to improve efficiency of beam utilization.

Figure 11A:
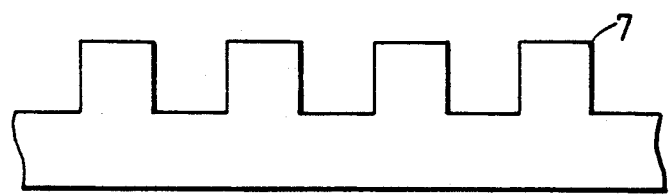
FIGS. 11A and 11B are sectional views showing other diffraction gratings which are phase diffraction gratings of a relief type.
Figure 11B:
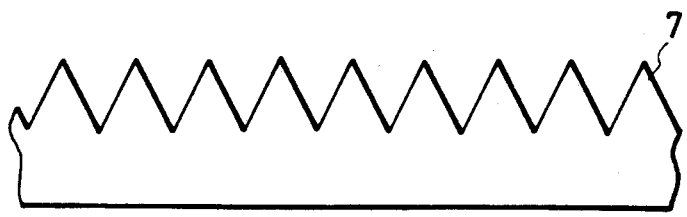

FIGS. 11A and 11B show sectional views of phase diffraction gratings for causing three-dimensional relief patterns to generate phase differences in beams. In addition to these, a hologram can be used to form a grating, refractive indices can be alternately changed in a transparent member to form a grating, or a reflecting film can be formed on the relief pattern to form transmission or reflection phase diffraction gratings.

FIG. 11A shows a rectangular phase grating, and FIG. 11B shows a triangular phase grating. In addition, a sinusoidal phase grating and an asymmetrical phase grating called a brazed diffraction grating can be used. The behavior of the diffracted beam in such a phase diffraction grating is determined by many parameters such as a grating shape, a refractive index of a material constituting the grating, a grating height, and a grating pitch. However, a general mathematical expression of such parameters is not derived herein.

As a characteristic feature of the phase diffraction grating, the order of the diffracted beam output therefrom can be determined by decreasing the grating pitch. For example, it is possible to output diffracted beams of 0th and ±1st orders.

The separation angle of the adjacent orders can be increased. All incident energy can be concentrated on only the diffracted beams of ±1st and ±2nd orders without outputting the diffracted beam of 0th order by controlling the grating height T and the refractive index n of the material constituting the grating as a function of a wavelength $\lambda 0$ of a used coherent beam. Efficiency of diffraction is high in this case.

In the rectangular diffraction grating shown in FIG. 11A, if the ambient refractive index is given as $n_0$ and a diffraction grating is designed to satisfy the following equation:

$$|n-n_0|\cdot T = (\tfrac{1}{2}+m)\lambda 0 (m=0, 1, 2, 3, \ldots) \quad (16)$$

the diffracted beam of 0th order is not generated. In this case, when the separation angle of diffracted beams and efficiency of diffraction thereof are taken into consideration, it is preferable to detect interference fringes by using the diffracted beams of ±1st orders in favor of measurement precision and the encoder configuration.

The brazed diffraction grating increases the intensity of a diffraction grating of a specific order. For example, incident energy is concentrated on the diffracted beams of +1st or +3rd order, and the intensity of other diffracted beams is weakened. The diffracted beam of +3rd order can be used to greatly improve the measurement resolution and obtain a sufficiently high intensity with good measurement precision.

As described above, even if the phase diffraction grating is used, the intensity of the diffracted beam of the specific order can be set to be maximum. Therefore, efficiency of utilization of the beam, efficiency of interference, and measurement precision can be improved.

The diffraction gratings which can be used in the present invention include a so-called amplitude diffraction grating consisting of light-transmitting and light-shielding areas, and a phase diffraction grating consisting of areas having different refractive indices. In particular, the phase diffraction grating can be prepared by forming a three-dimensional relief pattern in a peripheral portion of a transparent disk. Therefore, such a grating can be easily formed by an embossing or a stamper process in a mass production line.

The present invention has been described with reference to rotary encoders. However, the present invention is applicable to a linear encoder. The present invention is applicable to all encoders of a type for detecting a moving or rotating state of the diffraction grating by detecting interference fringes of the diffracted beams of specific orders among all diffracted beams output from the diffraction grating.

Various modifications and changes may be made within the spirit and scope of the invention.

We claim:

1. A rotary encoder comprising:
   a rotary scale having a diffraction grating formed along a rotational direction thereof and a predetermined thickness distribution a;
   irradiating means for irradiating a first position of said rotary scale with a first radiation beam and a second position of said rotary scale, different from the first position, with a second radiation beam, and for generating first and second diffraction beams; and
   means for receiving an interference beam formed by superposing the first diffraction beam and the second diffraction beam emitted from said rotary scale with each other, and for converting the interference beam to a signal to measure the rotational state of said rotary scale in accordance with the signal with predetermined accuracy,
   wherein the thickness distribution a of said rotary scale satisfies the equation:

$a = \tan^{-1}(\Delta k/l) \leq \tan^{-1}[\{\pi(m-n)\lambda/360 n_0 \cdot p\} \cdot \theta_k]$ for $n_0$ including 1,
   where $n_0$ is a refractive index of said scale, p is a pitch of said diffraction grating, $\lambda$ is a wavelength of the first and second radiation beams, m and n are orders of the diffracted beams of the specific orders, l is a distance between the different positions, $\Delta k$ is an optical path difference generated when the first and second radiation beams pass through the different positions once, and $\theta_k$ is an allowable value of an angular error of said encoder.

2. A rotary encoder as claimed in claim 1, wherein said irradiating means includes a semiconductor laser for emitting the first and second radiation beams.

3. A rotary encoder according to claim 1, wherein said first and second positions are arranged with respect to a rotational center of said rotary scale so that eccentricity between a center of the diffraction grating on said rotary scale and said rotational center of said rotary scale does not influence the accuracy of measurement.

4. A rotary encoder according to claim 1, wherein the first diffraction beam is a +1-order diffraction beam and the second diffraction beam is a −1-order diffraction beam, and wherein said rotary scale is provided so as to satisfy the following relation:

$\Delta > 3°$ where $\Delta$ represents the angle between the 0-order diffraction light beam and the +1-order diffraction light beam.

5. A rotary encoder according to claim 1, wherein the pitch P of said diffraction grating satisfies $P < 15 \mu m$.

6. A rotary encoder according to claim 1, wherein said diffraction grating comprises a phase type diffraction grating.

7. A rotary encoder according to claim 6, wherein said diffraction grating comprises first and second portions having different refractive indices from each other and arranged alternately, and satisfying $\phi W/\phi P = 0.5$ where $\phi P$ is an angular pitch of said first portion and $\phi W$ is an angular pitch of said second portion.

8. A rotary encoder according to claim 7, wherein the first diffraction beam is a +1st-order diffraction beam, and the second diffraction beam is a −1st-order diffraction beam.

9. A rotary encoder according to claim 1, wherein said scale has first and second areas having optical characteristics different from each other and being alternately arranged and a ratio of a width of said first area in the rotational direction to a width of a sum of said first and second areas in the rotational direction is 0.5.

10. A rotary encoder according to claim 1, wherein said scale has first and second areas having optical characteristics different from each other and being alternately arranged, and a ratio of a width of said first area in the rotational direction to a width of a sum of said first and second areas in the rotational direction is 0.25.

11. A rotary encoder according to claim 10, wherein the first diffraction beam is a +2nd-order diffraction beam, and the second diffraction beam is a −2nd-order diffraction beam.

12. A rotary encoder according to claim 1, wherein said first and second positions are set so as to be substantially symmetrical with each other with respect to a rotational center of said rotary scale.

13. A rotary encoder according to claim 12, wherein said irradiating means includes a beam splitter by which the radiation beam from said radiation source is divided so that the first and second radiation beams are produced, and wherein the first and second diffraction beams are mutually superposed through said beam splitter to be directed to said beam receiving means.

14. A rotary encoder according to claim 13, wherein said irradiating means has first reflecting means for reflecting a +1st-order diffraction beam produced by the first radiation beam and being diffracted by the first position toward the first position and for causing the +1st-order diffraction beam to be diffracted again by the first position so as to produce the first diffraction beam as a +1st-order diffraction beam and second reflecting means for reflecting a −1st-order diffraction beam produced by the second radiation beam being diffracted by said second position toward the second position and for causing the −1st-order diffraction beam to be diffracted again by the second position so as to produce the second diffraction beam as a −1-st-order diffraction beam.

* * * * *

UNITED STATES PATENT AND TRADEMARK OFFICE
CERTIFICATE OF CORRECTION

PATENT NO. : 5,101,102
DATED : March 31, 1992
INVENTOR(S) : Tetsuharu Nishimura, et al.

It is certified that error appears in the above-identified patent and that said Letters Patent is hereby corrected as shown below:

COLUMN 5:

Line 45, "$a=\tan^{-1}(\Delta K/\ell)=\tan^{31}{}^{1}(K\lambda/2n_0\ell)$" should read --$a=\tan^{-1}(\Delta K/\ell)=\tan^{-1}(K\lambda/2n_0\ell)$--.

COLUMN 7:

Line 42, "$a \leq \tan^{31}{}^{1}[\{\pi(m-n)\lambda/360n_0P\}\theta K]$" should read --$a \leq \tan^{-1}[\{\pi(m-n)\lambda/360n_0P\}\theta K]$--.

Signed and Sealed this

Twentieth Day of July, 1993

Attest:

MICHAEL K. KIRK

*Attesting Officer*   *Acting Commissioner of Patents and Trademarks*